Figure 1:
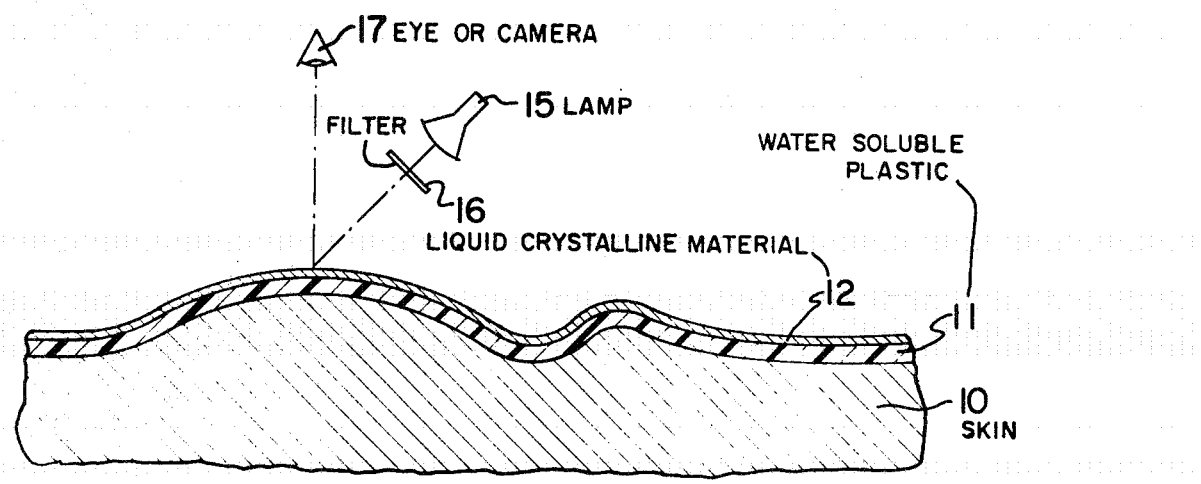

United States Patent

[11] 3,533,399

[72] Inventors Newton N. Goldberg
Penn Hills, Pittsburgh;
James L. Fergason, Penn Hills, Verona,
Pennsylvania
[21] Appl. No. 476,455
[22] Filed Aug. 2, 1965
[45] Patented Oct. 13, 1970
[73] Assignee Westinghouse Electric Corporation
Pittsburgh, Pennsylvania
a corporation of Pennsylvania

[54] TEMPERATURE SENSING MEANS AND METHODS
17 Claims, 2 Drawing Figs.
[52] U.S. Cl. .................................................. 128/2,
73/356
[51] Int. Cl. ............................................... A61b 10/00
[50] Field of Search ........................................ 167/84.5;
128/2.1, 2; 73/355, 356

[56] References Cited
UNITED STATES PATENTS
3,114,836  12/1963  Fergason et al................  250/83
3,287,559  11/1966  Barnes...........................  250/65

OTHER REFERENCES
Cressey "A New Technic . . ." pp. 89—91 of J. Inst. Derm., August 1964.
Lawson et al. "Skin Temperature . . ." pp. 255—260 of Canad. Med. Ass. J., Feb. 6, 1965.

Primary Examiner—Richard A. Gaudet
Assistant Examiner—Kyle L. Howell
Attorneys—F. Shapoe, Harvey L. Towle and Alex Mich, Jr.

ABSTRACT: A layer of water-soluble plastic material is first deposited on a living organism to serve as a barrier layer. A cholesteric layer or film is placed over the barrier layer. A chromatic display of the temperature of the organism, including minute variations, will be visible to the naked eye. The display may be photographed to provide a permanent acurate record. Certain specific cholesteric compositions exhibit a sensitivity to minute variations in a series of temperature ranges that correspond to ranges of various living organisms, particularly the human body. Vasoconstriction in extremities on smoking and effects of diseases are clearly evidenced by these compositions.

Patented Oct. 13, 1970     3,533,399

INVENTORS
NEWTON N. GOLDBERG
JAMES L. FERGASON

BY Alex Mich, Jr.

ATTORNEY

TEMPERATURE SENSING MEANS AND METHODS

This invention relates to a method of measuring skin temperature of living animals, including humans, and for demonstrating skin temperature patterns. More particularly, this invention relates to a method and formulations employing liquid crystalline materials for producing visible patterns corresponding to skin temperature patterns in living beings.

Skin temperature measurement is of great potential value in biologic study, and yet, because of the physical difficulties involved, has yielded data of limited usefulness and questionable reliability. Thermocouple and thermistor devices in current use, even when highly developed, have inherent drawbacks. They cannot be fastened or applied to the readily compressible irregularities in the surface of the skin without alteration in the surface with effects on the underlying vascular bed which cannot easily be quantitated. The dermatoglyphs, the normal markings and creases of the skin, are inaccessible to the most miniaturized of thermistors, and the least compression leads to cross radiation at the base of the depression with readings higher than in the natural state. The greatest difficulty, however, lies in the complexity of skin temperature patterns, particularly where the integument is reflected within limited areas over structures successively vascular and nonvascular as, for instance, on the dorsum of the human hand. Differences of 2° to 3° C. may occur within an area of a few mm. square and fluctuations may occur unevenly in these patterns from moment to moment. The placement of the thermistor probes over these patterns can only be regarded as arbitrary averaging, and even elaborate multiprobe devices can give only a crude picture of the actual temperature state.

Figure 2:
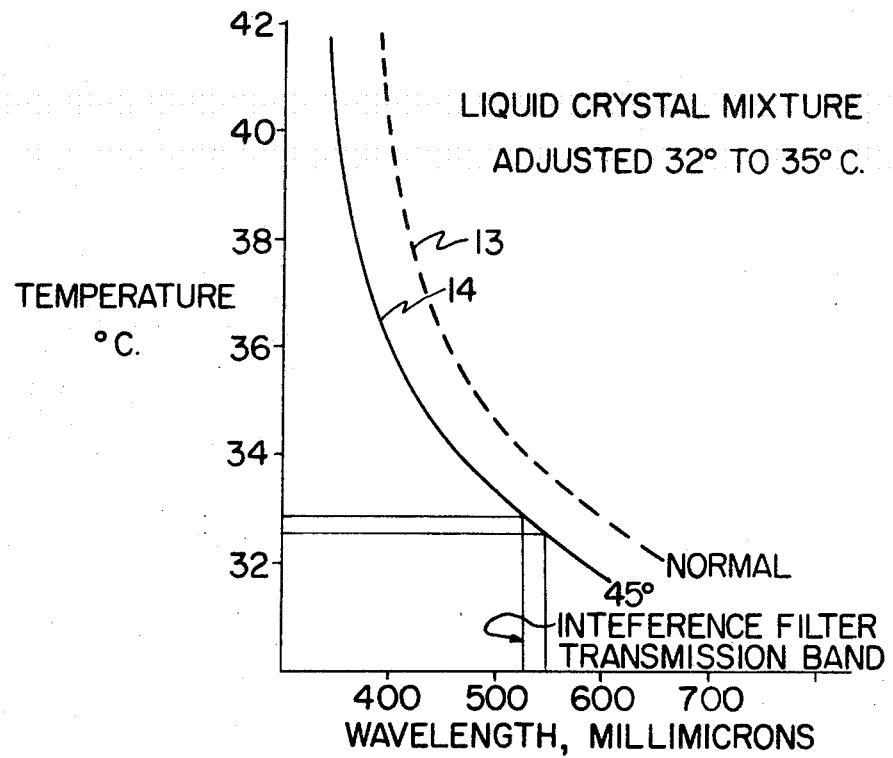

It is an object of this invention to provide a method and materials for measuring skin temperature of living animals. A further object is to provide a method and materials for producing visible patterns corresponding to skin temperature patterns in living beings. Another object is to provide a method for the demonstration and photographic recording of temperature patterns through the application to the skin of compositions containing liquid crystalline materials. It is a further object to provide formulations of liquid crystalline materials which are suitable for demonstrating skin temperature patterns. Another object is to provide thermally sensitive materials which convert a heat image imposed thereon directly into a visible image. A further object is to provide materials for converting a thermal image into a visible image having color variations between areas of different temperatures. These and other objects are apparent from and are achieved in accordance with the following disclosure taken in conjunction with the attached drawings wherein:

FIG. 1 is a cross-sectional view of a piece of skin with a film of liquid crystalline material applied thereto irradiated with visible light and observed by a human eye; and FIG. 2 is a typical graph showing the relationship of temperature to the wavelength of light scattered by a mixture of liquid crystalline materials for normal and 45° angle of incidence.

Much effort has been directed to the problem of viewing objects by the radiation emitted from them which falls within the infrared portion of the electromagnetic spectrum. Objects emit infrared radiation, which is invisible to the naked eye, having an intensity which is a function of the temperature and the emissivity of the object. Therefore, the problem has been to convert a heat image which is invisible to the eye into an image which can be seen. Various schemes have been proposed for this purpose. One disadvantage which exists in most of the presently known devices is that the member on which the heat image is imposed, for conversion to a visible image, is not sufficiently sensitive to distinguish between objects which are emitting radiation in intensities which are not greatly different. Another common drawback is that in order to obtain a visible image a complex device is necessary to convert the heat pattern. The complexity frequently resides in the electrical components necessary for the device to function, often including a tube in which an electron beam is generated, resulting in a bulky and costly device which is unsuitable for many applications. The present invention provides thermally sensitive materials which are capable, by reason of their unique properties, of converting a heat pattern imposed thereon into a visible pattern by exposure of the thermally sensitive materials to visible light.

As shown in FIG. 1, the invention comprises a film of water-soluble plastic material 11 containing a pigment which absorbs transmitted light, that is, which has a color which is complementary to the color of the light incident to the film. The film 11 of plastic and pigment is preferably applied to the skin 10 in liquid form and allowed to dry thereon, thus forming a coating which conforms to the surface of the skin. To this film is applied another film 12 of liquid crystalline thermosensitive material, that is, a cholesteric material or combination of cholesteric materials, such as those disclosed in the Fergason et al U.S. Pat. No. 3,114,836. The cholesteric materials are usually applied in organic solvents, sometimes in conjunction with film-forming organic materials. It is desirable that the films 11 and 12 be of very thin form so that they are rapidly responsive to small temperature changes in the skin.

An optical property exhibited by cholesteric materials is circular dichroism. When ordinary white light is directed at a cholesteric material, the light is separated into two components, one with the electric vector rotating clockwise and the other with the electric vector rotating counterclockwise. Depending on the material, one of these components is transmitted and the other is reflected or scattered. It is this property that gives the cholesteric phase its characteristic irridescent color when it is illuminated by white light. The particular combination of colors depends on the material, the temperature and the angle of the incident beam.

The molecular structure of a cholesteric liquid-crystal substance is very delicately balanced and can be easily upset. Thus any small disturbance that interferes with the weak forces between the molecules can produce marked changes in such optical properties as reflection, transmission. birefringence, circular dichroism, optical activity and color.

Perhaps the most striking optical transformation that occurs in a cholesteric substance in response to subtle changes in its environment is the variation of color with temperature. Although most cholesteric substances are colorless as liquids, they pass through a series of bright colors when they are cooled through their liquid-crystal phase. In this phase they may first appear to be violet, then blue, then green, then yellow, then red and finally colorless again as the reflection maximum enters the infrared region. Further cooling brings these substances into the smectic phase, which is also colorless.

All cholesteric liquid crystals do not respond in the same way to fluctuations in temperature. For example, some change only from red to green on cooling; others change from red to green to blue or from red to green and black to red. Some substances are initially blue and change to green and then to red when they are cooled; still others show no reaction at all to changes in temperature. The important point, in any case, is that at a certain temperature a given material or combination of materials will always exhibit the same color. Moreover, the rate of change from color to color as well as the exact temperature at which specific color changes occur are invariable. Therefore by mixing cholesteric substances in various proportions any desired temperature-color combination can be obtained.

Thin films of cholesteric liquid crystals exhibit a property, upon interaction with light, which may be termed selective scattering. The term "scattering" is used rather than reflection in order to distinguish from the effect occuring on mirror surfaces wherein light is reflected at an angle equal to the angle of incident light. A scattered light ray may leave the scattering material at an angle unrelated to the angle of incident light. A selectively scattering film, when observed with light impinging the film on the same side as that which is viewed, has an apparent color which is the complement of the color of the light transmitted by the film.

The terms "light" and "color" as used herein have the broad connotation of referring to electromagnetic radiation generally, rather than to solely visible radiation.

Most materials do not selectively scatter light in that the light transmitted through them is not complementary to the light scattered by them but rather is within the same wavelength band. The difference in effect between selectively scattering materials and ordinary materials is believed due to the fact that in ordinary materials some light is absorbed by electron-photon interaction while in selective scattering materials there is very little absorption. This explanation is not essential to the successful practice of our invention but may aid in understanding the operation thereof.

The phenomenon of selective scattering as exhibited by cholesteric liquid crystalline films is independent of whether the light illuminating the film is polarized or not. The color and intensity of the scattered light depends upon the temperature of the scattering material and upon the angle of incidence of illumination.

Another property exhibited by cholesteric liquid crystalline material is what is commonly known as optical activity. Optical activity is observed by illuminating the material with linearly polarized light. Due to the optical activity of the material, also called optical rotatory power the polarization vector of the light is caused to rotate. The amount of this rotation has been found to be dependent upon the temperature of the material.

Different combinations of cholesteric substances have been used to measure temperatures ranging from −20°C. to +250°C. These substances have been fabricated into flexible films that can be applied to surfaces to record temperature gradients in several directions. In medicine cholesteric liquid-crystal substances can be applied to the surface of the skin to locate veins, arteries or other internal structures that would conduct heat at a different rate from that in the surrounding tissue.

With further reference to FIG. 1, the temperature of the skin 10 is quickly adopted by the thin films 11 and 12. The cholesteric material or materials in the film or layer 12 exhibit a color which is directly dependent on the temperature of the film and thus on the temperature of the skin. A cholesteric material, or preferably a combination of such materials, is selected which exhibits color changes in the temperature range of the skin of a human being, usually from 32° to 35°C. For animals and other living matter the temperatures may vary from below 5°C. to 40°C. and higher. When a film of liquid crystals suitable in the range is applied, a brilliant array of colors appears within a few seconds. The coolest areas are red, and as the temperature increases the colors progress through yellow and green to blue and violet. Beyond the scale in either direction the field is black. These changes occur with negligible time lag and are reversible almost indefinitely. Heat from skin is absorbed by the thin plastic film and by the cholesteric material, causing a thermal image to be formed on the layer 12 of the latter. Due to the variations in temperature of the skin from area to area, a temperature pattern is formed on the film of liquid crystals. Both the plastic film 11 and the liquid crystalline film 12 are so thin that there is practically no barrier to the transmission of the temperature pattern of the skin to the liquid crystals. An illuminating means 15, such as a lamp, directs visible radiation through a filter 16 which transmits the desired portion of the spectrum onto the exposed face of the film 12 of thermally sensitive liquid crystalline material. The latter displays a visible image of light scattered by the liquid crystalline film which corresponds to the temperature pattern developed thereon corresponding to the temperature pattern of the skin and can be observed by an eye or camera 17.

For any particular cholesteric material or combination of materials, the colors for specific temperatures can be determined. Then when this material or combination of materials is incorporated in the film or layer 12, the temperature of any area can be determined by the color of that area. This color is visible to the naked eye and can be recorded photographically if a permanent record is desired. Minute changes, as small as 0.1°C., in skin temperatures are readily discerned by significant changes in color of the particular area under observation.

FIG. 2 shows typical temperature-wavelength curves 13 and 14 (for normal and 45° angle of light incidence, respectively) for a typical combination of cholesteric materials. It is possible, by varying the relative proportions of cholesteric materials in any combination, to produce compositions having temperature response ranges over any desired scale. As illustrated in FIG. 2, a mixture of cholesteric substances having a temperature response range from 32° to 35°C. has been selected. The wavelength of the scattered light from this mixture varies with the temperature of the mixture and also with the angle of the beam of the light incident thereon. For any definite angle of incidence, the wavelength (and thus the color) of the scattered light is a measure of the temperature of the mixture of cholesteric materials and thus of the skin with which they are in contact.

Because of the exceptional optical properties of cholesteric liquid crystalline films there are several modes of operating in accordance with the present invention. As before stated, a film of the thermally sensitive material exhibits selective scattering of light incident to it. This light may be linearly polarized, circularly polarized or unpolarized and in addition may be either monochromatic or white light.

The color of the scattered light is determined by the temperature of the film at the point of scattering. Visible colors will appear corresponding to the temperature of each point on the film. For example, an elemental area having a temperature of about 32°C. would appear red to a viewer while an area having a temperature of about 35°C. would appear green, as is shown by the curve 13 of FIG. 2. The values shown in FIG. 2 are merely typical; other films would be thermally sensitive in other temperature ranges. If a thermal image were imposed upon the thermally sensitive film, illumination with white light would result in a color pattern because of the temperature dependent selective scattering as shown in FIG. 2. For this purpose the lamp 15 would be a broad band light source whose output is substantially unfiltered before striking the film 12.

While it is most useful that the lamp 15 provide visible radiation and a visible image, it may produce light in some other part of the spectrum, such as ultraviolet. When ambient light provides radiation in the desired portion of the spectrum, additional illumination by a lamp 15 would not be necessary.

The image is produced by the interaction of the light from the illuminating means 15 with the thermally sensitive film 12 upon which the temperature pattern exists. The interaction takes place in a temperature dependent manner.

The base film of water-soluble plastic material 11 in FIG. 1 serves two functions. First, it act as a barrier to oils and similar skin excretions and thus protects the cholesteric layer 12 from contamination. Second, it serves as a supporting layer for the pigment which absorbs the light component transmitted by the cholesteric layer 12, allowing only the scattered component which varies with temperature to remain.

In the practice of the invention on human beings, a preliminary check with the thermistor is made to establish roughly the temperature range of the skin surface to be studied, and a suitably adjusted liquid crystalline material or combination of materials is chosen. After the base film has been applied and allowed to dry, the liquid crystal solution is painted on, preferably in a volatile organic solvent, and allowed to dry. A visible color pattern appears immediately and the colors can be correlated with temperatures from the known characteristics of the liquid crystalline material or combination of materials. Isothermal areas are represented by the same colors in the pattern. If a photographic record of the temperature pattern is desired it can be made by the following procedure:

A narrow band interference filter with spectral transmission characteristics corresponding to the temperature level to be studied is placed over the camera lens. The readily available Hg green filter (546 millimicrons) is convenient, as the light transmitted by this filter falls approximately in the center of the visible spectrum, thereby allowing for shifts in either direction, and being in the range of maximal retinal sensitivity it enables the operator to focus with greatest accuracy on the ground glass of the camera.

The area to be studied is illuminated by a source rich in wavelengths transmitted by the filter. Discharge lamps are the most efficient, but high intensity tungsten sources such as projection lamps can be substituted.

The area is photographed in the usual manner. The exposure will depend on the nature of the source, and the speed of the film. The emulsion used must, of course, be sensitive to the light transmitted by the filter.

When the technique is to be used not only to demonstrate patterns, but to measure accurately the temperatures existing in the pattern consideration must be given to the geometry of the setup. The color reflected to the lens of the camera depends not only on the temperature, but on the angle of the light source and the angle of the axis of the lens with respect to the surface of the skin. When camera and light source are maintained at the same angle the same color will be recorded in each photograph, but since the temperature-wavelength curves for the liquid crystal mixtures are derived from normal incident lighting (source perpendicular to the skin), a correction in wavelength must be made before the temperature can be read with greatest accuracy from these curves.

This correction is made by applying an experimentally verified correction factor. The wavelength of maximum reflection as a function of angle for a constant temperature is given by:

$$\lambda = \lambda_n \cos \tfrac{1}{2} (\sin^{-1} \tfrac{1}{1.5} \sin \phi_1 + \sin^{-1} \tfrac{1}{1.5} \sin \phi_2)$$

where:

$\lambda$ = Wavelength of maximum scattering.
$\lambda_n$ = Wavelength of maximum scattering for normal incidence and observation.
$\phi_1$ = The angle of incidence.
$\phi_2$ = The angle of reflection.

This is the general case. A convenient angle for the light source and the lens axis is 45°.

In FIG. 2, the correction for $\Phi_1 = \Phi_2 = 45°$ is shown plotted with the curve for normal incidence. For this case $\lambda = 0.882 \lambda_n$.

If $\Phi_1 + \Phi_2 = 90°$ but the individual angles vary there is a small shift in this factor; for instance if $\Phi_1 = 30°$ and $\Phi_2 = 60°$, $\lambda = 0.887 \lambda_n$. This difference will generate less than 0.05°C. error in the temperature measurement, so that the angle between light source and camera is the most important geometrical factor.

When these criteria are met, only those areas within the experimental field which reflect wavelengths transmitted by the filter will be recorded on the film, and a comparision of negative densities, or white areas on the positive point, with the wavelength-temperature curve of the mixture used will indicate the temperature which existed within these areas when the photograph was made. The precision of the measurement will be a function of the width of the transmission band of the interference filter. By using different filters, and/or changing the reaction range of the mixtures, all points existing at any temperature can similarly be recorded.

This technique offers many and varied biologic applications. It can be used as an alternative to the infrared scanning procedures which have been used in the localization and diagnosis of human neoplasms. It offers a flexible indicator in pharmacologic studies of drugs which affect vascular structures, and should prove useful as an aid to the evaluation of the peripheral blood vessels. Several applications to the study of plant physiology are apparent. This technique should prove to be useful wherever the temperature pattern of a comparatively dry body surface is of interest to the investigator.

For instance, the dorsum of the human hand has been treated in accordance with this invention and temperature patterns recorded photographically. From the intercepts of the interference filter transmission bands shown in FIG. 2, it was found that the depressed areas between venous structures recorded as white, representing 32.6°C. for the particular liquid crystalline composition used. Through cinephotography and time lapse cinephotography, pattern changes were easily recorded. When cold air was blown over the skin, areas which dropped below 32.6°C. were no longer visible as white and areas over venous structures dropped to 32.6°C. and recorded as white. Enlargement of the photographs caused dermatoglyphics to stand out clearly and a minute lentigo appeared as a sharply marginated oval structure. This demonstrates the feasibility of the method to microtemperature studies.

The plastic film 11 applied to the skin can be any of the well known water-soluble plastic materials, such as polyvinyl alcohol, methyl cellulose and polyvinylpyrrolidone. The film is applied as an aqueous solution or suspension and is preferably about 20 to 50 microns in thickness. Thicker films are operative but may introduce a temperature adjustment lag which will affect the sharpness of the spatial temperature distribution which may be undesirable in many measurements.

The pigment which is applied to the skin or embodied in the water-soluble plastic film 11 is one which will absorb the light transmitted by the film 11. It has a color which is complementary to the color of the light beam directed on the cholesteric film 12. When the incident light is white, the pigment should be black, for example, carbon black or similar black pigment. When the incident light is red, for example, the color of the pigment should be green.

The film of cholesteric material 12 can be a very thin coating such as that left after evaporation of 10–20 percent solution of the cholesteric material or combination of materials which preferably are dissolved in a volatile organic solvent such as chloroform, petroleum ether or similar hydrocarbon or halogenated hydrocarbon solvent so as not to affect the previously applied plastic. This film need only be a few microns in thickness, depending on the concentration and amount of the solution applied to a given area, while the maximum thickness is of the order of 50 microns.

Cholesteric liquid crystalline materials which are suitable for use as the thermally sensitive film 12 include derivatives of $\Delta^5$-cholestene-3$\beta$ substitution as well as compounds derived from cholesterol. All these compounds are characterized by having a cholesteric liquid crystalline phase.

Examples of suitable materials include mixed esters of cholesterol and inorganic acids such as cholesteryl chloride, cholesteryl nitrate, etc., organic esters of cholesterol such as cholesteryl crotonate, cholesteryl nonanoate, cholesteryl chloroformate, cholesteryl linoleate, cholesteryl linolenate, cholesteryl oleate, cholesteryl erucate, cholesteryl butyrate, cholesteryl caprate, cholesteryl laurate, cholesteryl myristate, cholesteryl clupanodonate, cholesteryl or dihydrocholesteryl decyl carbonate, cholesteryl oleyl carbonate, cholesteryl erucyl carbonate, cholesteryl or dihydrocholesteryl heptyl carbamate, etc.; ethers of cholesterol such as cholesteryl decyl ether, cholesteryl lauryl ether, cholesteryl oleyl ether, etc.; alkyl amides and aliphatic secondary amines derived from 3$\beta$-amino-$\Delta^5$-cholestene. The corresponding derivatives of $\beta$-sitosterol as well as the active amyl ester of cyano benzilidene amino cinnamate may be effective. Also, the corresponding 3$\beta$-derivatives of cholestane may be employed, for example, dihydrocholesteryl oleyl carbonate.

The alkyl and aryl portions of the above compounds, apart from the cholesteryl and dihydrocholesteryl moiety, are derived from saturated and unsaturated fatty acids and alcohols and aryl acids and alcohols having from 1 to 27 carbon atoms per molecule, the unsaturated groups having from 1 to 6 olefinic groups per chain.

Extremely effective compositions for the practice of the invention are mixtures of cholesteric materials in proportions as follows:

A. At least 75 percent and not more than 99 percent by weight of at least one compound selected from the group consisting of oleyl cholesteryl carbonate, oleyl dihydrocholesteryl carbonate, cholesteryl nonanoate, dihydrocholesteryl nonanoate, cholesteryl oleate, dihydrocholesteryl oleate, cholesteryl decanoate and dihydrocholesteryl decanoate, and B. The balance being at least one of the group consisting of cholesteryl and dihydrocholesteryl esters, ethers and carbamates, and alkyl amides and aliphatic secondary amines derived from $3\beta$-amino-$\Delta^5$-cholestene.

Particularly good results have been obtained from the following mixtures: at least 1 percent and not over 80 percent by weight of at least one member of the group consisting of cholesteryl decanoate, dihydrocholesteryl decanoate, cholesteryl nonanoate and dihydrocholesteryl nonanoate and at least 20 percent and not over 99 percent by weight of at least one compound of the group consisting of cholesteryl oleyl carbonate, dihydrocholesteryl oleyl carbonate, cholesteryl oleate and dihydrocholesteryl oleate.

As can be seen from the foregoing disclosure, each of these compounds has been found useful, and mixtures of two or more such compounds have also been found useful. The advantage of mixing the pure compounds is to obtain certain properties desired for a particular application: for example, to obtain high sensitivity within a particular temperature range which may be made as broad or narrow as one desires for most practical purposes.

As a particular example of a film used in the practice of this invention a mixture was made of cholesteryl crotonate and cholesteryl oleate. The cholesteryl oleate was prepared by reaction of oleic acid with cholesterol in the presence of an acid catalyst. A suitable catalyst is p-toluenesulfonic acid. The cholesteryl crotonate was prepared by the direct reaction of crotonyl chloride with cholesterol. A mixture of equal quantities of these compounds was then dissolved in chloroform in a concentration sufficient to form a readily flowing solution. The thermally sensitive film was formed by pouring the solution onto the support film, which in this case was polyethylene terephthalate to which the infrared absorbing layer had already been applied, and allowing the solvent to evaporate. The resulting film has a high viscosity. The particular example just described is sensitive near room temperature.

The following additional examples illustrate the practice of the invention.

EXAMPLE 1

A series of cholesteryl ester combinations were produced, each combination having a wavelength-temperature curve in the visible spectrum at temperatures close to body temperatures of living animals. The following compositions, consisting essentially of 5—45 percent cholesteryl nonanoate, 43—80 percent cholesteryl oleate, the balance selected from cholesteryl crotonate and dihydrocholesteryl benzoate, have been found useful in measuring the skin temperatures and recording skin temperature patterns (percentages being by weight):

| Temperature range, °C | Percent | | | |
|---|---|---|---|---|
| | Cholesteryl | | | Dihydrocholesteryl benzoate |
| | Nonanoate | Oleate | Crotonate | |
| 24–26 | 10 | 70 | 20 | |
| 41–44 | 45 | 40 | | 15 |
| 39–42 | 25 | 60 | | 15 |
| 25–29 | 30 | 48 | 7 | 15 |
| 18–24 | 20 | 55 | 10 | 15 |
| 22–25 | 35 | 43 | 7 | 15 |
| 30–34 | 40 | 40 | 5 | 15 |
| 34–37 | 5 | 80 | 5 | 15 |
| 33–36 | 5 | 80 | 6 | 15 |
| 31.5–35 | 5 | 80 | 7 | 15 |

A 10 percent solution of each of these compositions in chloroform was applied with a dropper to the surfaces of a series of Mylar polyethylene terephthalate films coated on the reverse side with carbon black or gold black and allowed to evaporate. The resulting films of cholesteric materials exhibit visible color patterns in white light and the colors can be calibrated with temperature as described in the Fergason et al. U.S. Pat. No. 3,114,836. In this way the temperature ranges listed above were determined for each composition.

Each of these compositions in solution in chloroform is applied over a plastic film, such as polyvinyl alcohol admixed with carbon black, applied to a living body, and temperatures of the treated areas were determinable under various conditions.

EXAMPLE 2

Another series of cholesteric compositions was prepared and calibrated as in Example 1. These compositions, consisting essentially of 30—44 percent oleyl cholesteryl carbonate, 46—60 percent cholesteryl nonanoate, the balance being cholesteryl benzoate, also exhibited visible temperature patterns in white light near body temperature, as shown in the following table:

| Temperature range, °C | Percent | | |
|---|---|---|---|
| | Oleyl cholesteryl carbonate | Cholesteryl nonanoate | Cholesteryl benzoate |
| 37–40 | 30 | 60 | 10 |
| 36–39 | 32 | 58 | 10 |
| 35–38 | 34 | 56 | 10 |
| 34–37 | 36 | 54 | 10 |
| 33–36 | 38 | 52 | 10 |
| 32–35 | 40 | 50 | 10 |
| 31–34 | 42 | 48 | 10 |
| 30–33 | 44 | 46 | 10 |

Each of these compositions was applied to parts of human bodies, hands, feet back, upper arm and chest, over a 20-micron black polyvinyl alcohol film, and observed visually as well as photographically. Such effects as vasoconstriction in the extremities such as the hands, on smoking, for example, were readily observed. Effects of diseases were clearly evidenced by these compositions.

This series illustrates how a combination of cholesteric materials can be modified slightly in composition to provide a group of compositions which exhibit temperature responses at slightly different temperature ranges.

EXAMPLE 3

Another group of cholesteric materials, consisting essentially of 25—90 percent oleyl cholesteryl carbonate with the balance selected from cholesteryl nonanoate, cholesteryl decanoate, cholesteryl oleate, cholesteryl benzoate, cholesteryl cinnamate, cholesteryl dihydrocinnamate, cholesteryl phenyl carbonate and cholesteryl crotonate, exhibiting visible temperature patterns near body temperature is shown in the following table:

| Temperature range, °C. | Percent | | | | Other cholesteryl ester and percent |
|---|---|---|---|---|---|
| | Oleyl cholesteryl carbonate | Cholesteryl | | | |
| | | Nonanoate | Oleate | Benzoate | |
| 17-23 | 80 | | | | Cinnamate, 20. |
| 24-26 | 90 | | | | Cinnamate, 10. |
| 14-17 | 80 | | | | Dihydrocinnamate, 20. |
| 0-26 | 70 | | | | Dihydrocinnamate, 30. |
| 36-46 | 25 | 50 | | 25 | |
| 8-30 | 45 | 40 | | 15 | |
| 29-36 | 33 | 55 | | 12 | |
| 14-16 | 80 | | | | Phenyl carbonate, 20. |
| 20-25 | 70 | 10 | | 20 | |
| 10-19 | 60 | 25 | | 15 | |
| 34-38 | 25 | 40 | 20 | 15 | |
| 30-33 | 30 | 40 | 15 | 15 | |
| 31-34 | 28.5 | 40 | 16.5 | 15 | |
| 32-35 | 27 | 40 | 18 | 15 | |
| 33-36 | 35.5 | 40 | 19.5 | 15 | |
| 26-30 | 36 | 40 | 9 | 15 | |
| 29-32 | 43 | 47 | | 10 | |
| 30-33 | 41 | 49 | | 10 | |
| 31-34 | 39 | 51 | | 10 | |
| 32-35 | 34 | 54 | | 12 | |
| 33-36 | 32 | 56 | | 12 | |
| 34-37 | 30 | 58 | | 12 | |
| 27-30 | | 42.5 | 42.5 | | Crotonate, 15. |
| 40-42 | | 30 | 60 | | Crotonate, 10. |
| 22-26 | | 20 | 60 | | Crotonate, 20. |
| 29-31 | | 23 | 60 | | Crotonate, 17. |
| 22-25 | | 25 | 55 | | Crotonate, 20. |

A series of similar compositions with cholesteryl decanoate replacing all or part of the cholesteryl nonanoate may be prepared with essentially the same temperature range.

These compositions are suitable for use in determining the spatial temperature properties of living matter, as set forth in the present invention. It should be understood that small amounts of oil soluble materials may be added to the foregoing compositions without destroying their function.

We claim:

1. A temperature-sensitive film, suitable for indicating visually skin temperature patterns of a living organism when exposed to light, which comprises a plastic barrier layer having dispersed therein fine particles of a light absorbing pigment and being conformable to the surface of the organism and a layer of a cholesteric material in contact with said barrier layer, said cholesteric layer having a thickness not greater than about 50 microns.

2. A temperature-sensitive film as defined by claim 1 wherein the cholesteric material is an ester of cholesterol or dihydrocholesterol and an organic acid which contains 1 to 27 carbon atoms per molecule.

3. A temperature-sensitive film as defined by claim 2 wherein the plastic barrier layer is water-soluble polyvinyl alcohol.

4. A temperature-sensitive film as defined by claim 1 wherein the pigment is a black pigment.

5. A temperature-sensitive film as defined by claim 4 wherein the cholesteric material is an ester of cholesterol or dihydrocholesterol with an organic acid containing 1 to 27 carbon atoms per molecule.

6. A temperature-sensitive film as defined by claim 4 wherein the cholesteric material is a fatty acid ester of cholesterol or dihydrocholesterol.

7. A method of demonstrating visually skin temperature of a living organism which comprises (1) applying to the skin of said organism a deposit conforming to the surface of the skin, said deposit comprising a plastic barrier and a cholesteric material which exhibits color changes in the temperature range of the living organism in thermal contact with said barrier, said deposit containing means for absorbing radiation transmitted by said cholesteric material, (2) exposing said deposit to optical radiation and (3) observing color corresponding to skin temperature of said living organism.

8. The method of claim 7 wherein said visual pattern is photographically recorded.

9. The method of claim 7 wherein the cholesteric material is an ester of cholesterol or dihydrocholesterol and an organic acid containing 1 to 27 carbon atoms per molecule.

10. The method of claim 9 wherein the organic acid is an aralkyl acid containing up to 27 carbon atoms per molecule.

11. The method of claim 9 wherein the organic acid is an aryl acid containing up to 27 carbon atoms per molecule.

12. The method of claim 9 wherein the organic acid is an aliphatic acid containing 1 to 27 carbon atoms per molecule.

13. The method of claim 7 wherein the cholesteric material has a thickness not greater than 50 microns.

14. The method of claim 13 wherein the pigment is black.

15. The method of demonstrating skin temperature patterns in a human being which comprises applying to the skin a conformable combination of a film of plastic barrier material containing a black material dispersed therein and a coating on said film of a cholesteric material which exhibits color changes in the skin temperature range of the human being, selected from the group consisting of aryl and aliphatic esters and ethers of cholesterol and dihydrocholesterol, said aliphatic ester and ether groups containing 1 to 27 carbon atoms per group, and exposing said combination to white light, whereby visible colored patterns corresponding to isothermal temperature patterns in the skin are produced.

16. The method of claim 15 wherein the cholesteric material is selected from the group consisting of the aliphatic esters and ethers of cholesterol and dihydrocholesterol wherein the aliphatic radicals contain 10 to 18 carbon atoms per radical.

17. The method of claim 16 wherein the cholesteric material comprises at least 75 percent by weight and not more than 99 percent by weight of at least one compound selected from the group consisting of oleyl cholesteryl carbonate, oleyl dihydrocholesteryl carbonate, cholesteryl nonanoate, dihydrocholesteryl nonanoate, cholesteryl oleate, dihydrocholesteryl oleate, cholesteryl decanoate and dihydrocholesteryl decanoate, the balance being at least one other compound selected from the group consisting of cholesteryl and dihydrocholesteryl esters and ethers wherein the ester and ether groups contain 1 to 27 carbon atoms per group.